United States Patent
Kato

(10) Patent No.: US 10,740,059 B2
(45) Date of Patent: Aug. 11, 2020

(54) COMMUNICATION SYSTEM, COMMUNICATION DEVICE, AND COMPUTER PROGRAM

(71) Applicant: Yoshinaga Kato, Kanagawa (JP)

(72) Inventor: Yoshinaga Kato, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 165 days.

(21) Appl. No.: 15/595,574

(22) Filed: May 15, 2017

(65) Prior Publication Data

US 2017/0249118 A1    Aug. 31, 2017

Related U.S. Application Data

(63) Continuation of application No. 13/828,391, filed on Mar. 14, 2013, now abandoned.

(30) Foreign Application Priority Data

Mar. 22, 2012   (JP) .................................. 2012-065917
Nov. 15, 2012   (JP) .................................. 2012-251013

(51) Int. Cl.
*G06F 3/14*         (2006.01)
*G09G 5/14*         (2006.01)
(Continued)

(52) U.S. Cl.
CPC ............ *G06F 3/1431* (2013.01); *G06F 3/147* (2013.01); *G06F 3/1438* (2013.01);
(Continued)

(58) Field of Classification Search
CPC ...... G06F 3/1431; G06F 3/147; G06F 3/1438; G06F 3/1454; H04N 21/2187;
(Continued)

(56) References Cited

U.S. PATENT DOCUMENTS 5,625,410 A    4/1997   Washino et al.
6,025,871 A    2/2000   Kantor et al.
(Continued)

FOREIGN PATENT DOCUMENTS

CN    102027450 A    4/2011
JP    2004-48551 A   2/2004
(Continued)

OTHER PUBLICATIONS

Office Action dated Oct. 4, 2016 in Japanese Patent Application No. 2012-251013.

(Continued)

*Primary Examiner* — Rodney Amadiz
(74) *Attorney, Agent, or Firm* — Oblon, McClelland, Maier & Neustadt, L.L.P.

(57) ABSTRACT

According to an embodiment, provided is a communication device that performs communications of an image and audio. The communication device includes: a storage unit that stores therein arrangement information for specifying a display scheme for the image; an arrangement-information setting unit that sets arrangement information in the storage unit; and a display control unit that refers to the arrangement information and causes a plurality of display devices to display the image. The display control unit causes a first display device to display captured images of a local point and a remote point and causes a second display device to display an image supplied from an image supply device of the local point or the remote point.

8 Claims, 10 Drawing Sheets

(51) Int. Cl.
*G06F 3/147* (2006.01)
*G09G 3/00* (2006.01)
*H04N 5/222* (2006.01)
*H04N 21/2187* (2011.01)
*G09G 5/00* (2006.01)

(52) U.S. Cl.
CPC .............. *G06F 3/1454* (2013.01); *G09G 3/00* (2013.01); *G09G 5/14* (2013.01); *H04N 5/222* (2013.01); *H04N 21/2187* (2013.01); *G09G 5/003* (2013.01); *G09G 2370/06* (2013.01)

(58) Field of Classification Search
CPC ............ H04N 5/222; G09G 3/00; G09G 5/14; G09G 2370/06; G09G 5/003
USPC .......................... 345/1.1–3.1; 348/14.01–14.1
See application file for complete search history.

(56) References Cited

U.S. PATENT DOCUMENTS

| | | |
|---|---|---|
| 6,760,749 B1 | 7/2004 | Dunlap et al. |
| 8,537,195 B2 | 9/2013 | Duckworth et al. |
| 9,030,378 B2 | 5/2015 | Suzuki |
| 2007/0268203 A1 | 11/2007 | Moriwaki |
| 2010/0138780 A1 | 6/2010 | Marano et al. |
| 2011/0239142 A1 | 9/2011 | Steeves et al. |
| 2011/0243325 A1* | 10/2011 | Ishii .................. G06F 3/1431 380/218 |
| 2012/0069132 A1 | 3/2012 | Kato |
| 2014/0118222 A1 | 5/2014 | Barrett |

FOREIGN PATENT DOCUMENTS

| | | |
|---|---|---|
| JP | 2012-134941 | 7/2012 |
| WO | WO 96/31984 | 10/1996 |
| WO | WO 2009/143294 A2 | 11/2009 |

OTHER PUBLICATIONS

Extended European Search Report dated Jul. 4, 2013, in Application No. / Patent No. 13159836.9-1904.

Communication Pursuant to Article 94(3) EPC dated Jun. 2, 2014, in Application No. 13159836.9-1904.

Combined Office Action and Search Report dated Nov. 27, 2015 in Chinese Patent Application No. 201310207952.6 (w/English language translation).

* cited by examiner

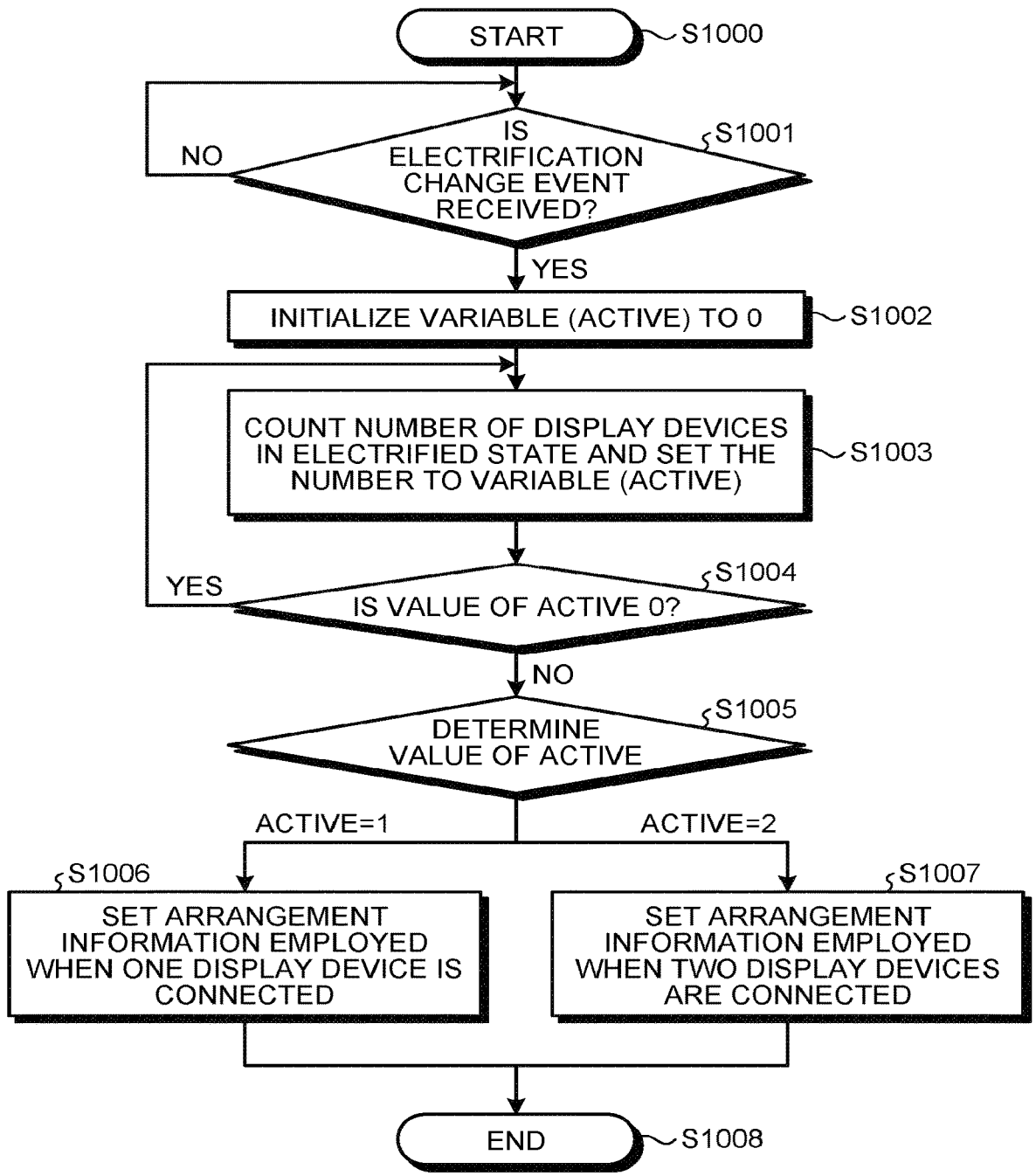

COMMUNICATION SYSTEM, COMMUNICATION DEVICE, AND COMPUTER PROGRAM

CROSS-REFERENCE TO RELATED APPLICATIONS

The present application is a continuation of U.S. application Ser. No. 13/828,391, filed Mar. 14, 2013, which claims priority to and incorporates by reference the entire contents of Japanese Patent Application No. 2012-065917, filed in Japan on Mar. 22, 2012 and Japanese Patent Application No. 2012-251013, filed in Japan on Nov. 15, 2012.

BACKGROUND OF THE INVENTION

1. Field of the Invention

The present invention relates to a communication system that performs video and audio communications, and in more detail to a communication system, a communication device, and a computer program that perform video and audio communications among a plurality of points.

2. Description of the Related Art

Along with the recent spread of networks that enable high-speed data communications such as the Internet, widely used is video conferencing for conducting a conference and the like by distributing video and audio among a plurality of points distant from one another.

As an embodiment of communication systems that realize such video conferencing, U.S. Pat. No. 6,760,749 discloses a content distribution device that displays a captured image of a remote point on a display device of a local point and that displays a material image used in a conference and the like on the display device.

There is a need to provide a communication system, a communication device, and a computer program that increase the visibility of an image displayed on a display device.

SUMMARY OF THE INVENTION

It is an object of the present invention to at least partially solve the problems in the conventional technology.

According to an embodiment, provided is a communication device that performs communications of an image and audio. The communication device includes: a storage unit that stores therein arrangement information for specifying a display scheme for the image; an arrangement-information setting unit that sets arrangement information in the storage unit; and a display control unit that refers to the arrangement information and causes a plurality of display devices to display the image. The display control unit causes a first display device to display captured images of a local point and a remote point and causes a second display device to display an image supplied from an image supply device of the local point or the remote point.

According to another embodiment, provided is a communication system that includes: a communication device that performs communications of an image and audio; and an image supply device that supplies an image to the communication device. The communication device includes: a storage unit that stores therein arrangement information for specifying a display scheme for an image; an arrangement-information setting unit that sets arrangement information in the storage unit; and a display control unit that refers to the arrangement information and causes a plurality of display devices to display the image. The display control unit causes a first display device to display captured images of a local point and a remote point and causes a second display device to display an image supplied from the image supply device of the local point or the remote point.

According to still another embodiment, provided is a computer program product that includes a non-transitory computer usable medium having computer readable program codes embodied in the medium that, when executed, causes a communication device to perform a communication method of an image and audio. The communication method includes: setting arrangement information for specifying a display scheme for an image into a storage unit; and referring to the arrangement information, causing a first display device to display captured images of a local point and a remote point, and causing a second display device to display an image supplied from an image supply device of the local point or the remote point.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a flowchart of detection processing for a display device performed by the communication device according to the embodiment after start-up.

DETAILED DESCRIPTION OF THE PREFERRED EMBODIMENTS

Exemplary embodiments are described below. The embodiments are not intended to limit the present invention.

Figure 1:
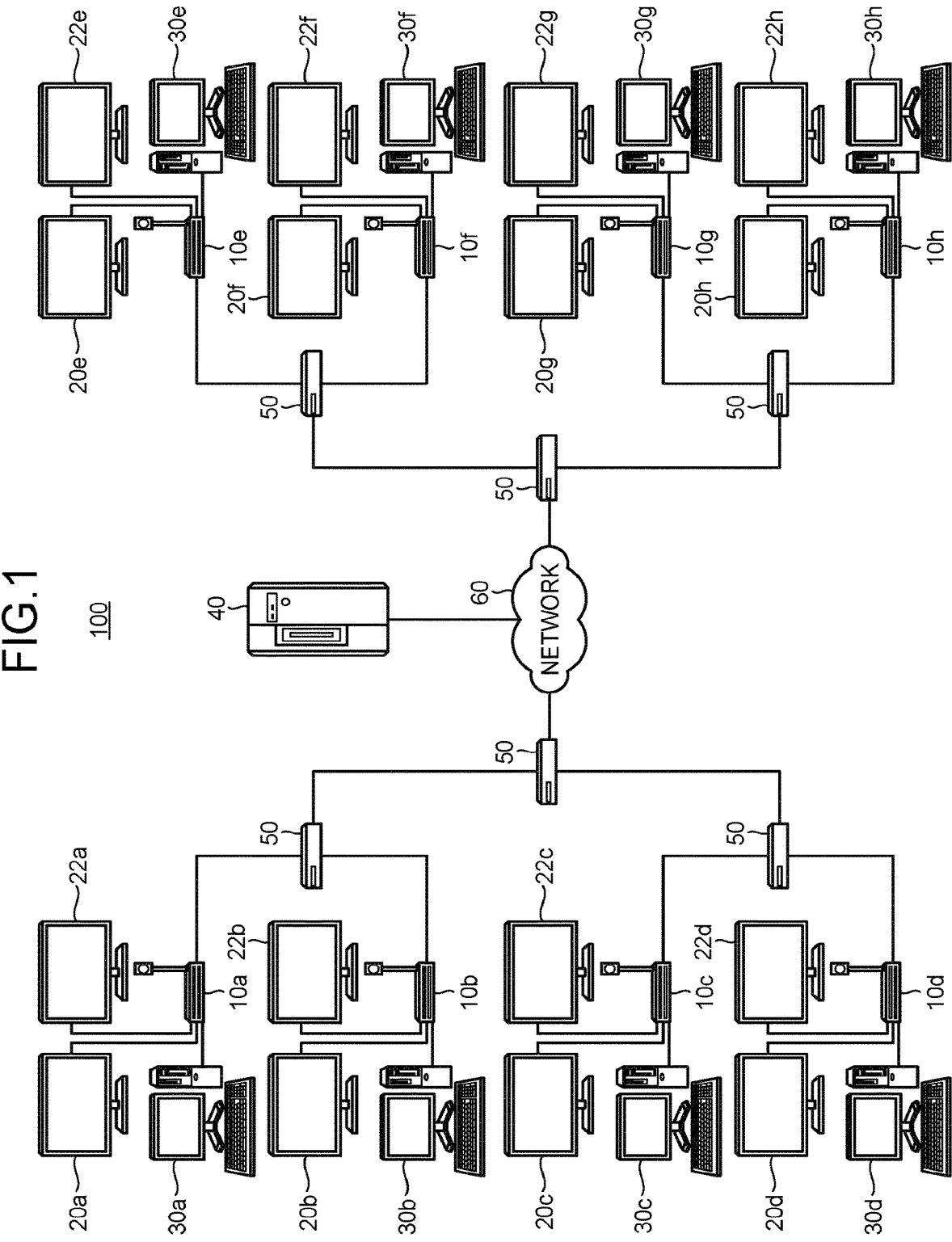
FIG. 1 is a schematic of a communication system according to an embodiment.

FIG. 1 is a schematic of a communication system according to an embodiment. A communication system 100 includes communication devices 10a to 10h, display devices 20a to 20h and 22a to 22h, image supply devices 30a to 30h, and a communication management device 40.

The communication devices 10a to 10h perform communications of images and audio with communication devices 10a to 10h of remote points. The communication devices 10a to 10h display images and output audio to the display devices 20a to 20h and 22a to 22h connected to the communication devices 10a to 10h respectively. The communication devices 10a to 10h transmit an image and audio of a local point to the communication management device 40 via routers 50 and a network 60. Furthermore, the communication devices 10a to 10h receive an image of a remote point from the communication management device 40. The communication devices 10a to 10h display the image of the local point and the image of the remote point, and output audio of the remote point to the display devices 20a to 20h and 22a to 22h respectively.

While the communication devices 10a to 10h output images to the display devices 20a to 20h and 22a to 22h respectively by wired communications in the present embodiment, they may output the images to the display devices by wireless communications in another embodiment. Furthermore, while two display devices are connected to one communication device in the present embodiment, three or more display devices may be connected to one communication device in another embodiment. In still another embodiment, the communication device may have one or more built-in display devices and be compatible with a dual display.

The image supply devices 30a to 30h supply an image to the communication devices 10a to 10h connected thereto, respectively. The image supply devices 30a to 30h supply an image displayed on display devices of the image supply devices 30a to 30h to the communication devices 10a to 10h, respectively. Examples of the image supplied from the image supply devices 30a to 30h include various images, such as a material image created by using word-processing software, spreadsheet software, and presentation software; a desktop screen of the image supply devices 30a to 30h; and user interface (UI) of an application program. In FIG. 1, desktop personal computers (PCs) are connected to the communication devices 10a to 10h as the image supply devices 30a to 30h, respectively. Instead of such desktop PCs, notebook PCs, tablet PCs such as iPad (registered trademark), and smartphones equipped with iPhone (registered trademark) and Android (registered trademark) may be preferably used as the image supply devices 30a to 30h, for example.

The communication management device 40 manages data communications in the communication system 100. The communication management device 40 establishes sessions among the communication devices 10a to 10h of a plurality of points to relay an image and audio of each of the communication devices 10a to 10h.

Figure 2:
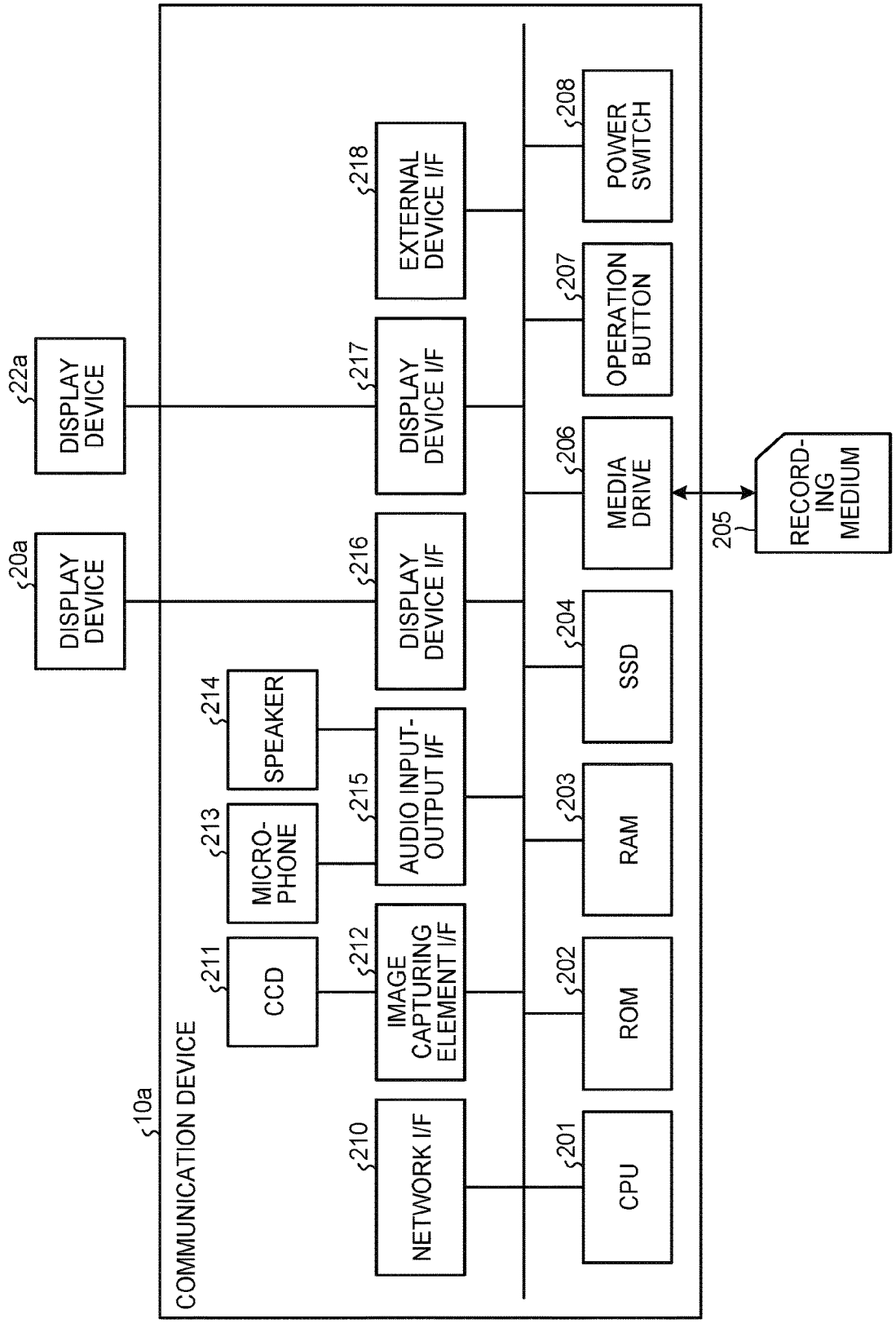
FIG. 2 is a block diagram of a hardware configuration of a communication device 10a according to the embodiment.

FIG. 2 is a block diagram of a hardware configuration of the communication device 10a according to the embodiment. The hardware configuration of the communication device 10a will be described below with reference to FIG. 2. Because the hardware configurations of the other communication devices 10b to 10h are the same as that of the communication device 10a, explanations thereof are to be omitted.

The communication device 10a includes a central processing unit (CPU) 201, a read-only memory (ROM) 202, a random access memory (RAM) 203, a solid state drive (SSD) 204, and a media drive 206. These devices are connected via a data bus 209.

The CPU 201 is a processor that controls the entire operation of the communication device 10a. The ROM 202 is a storage device in which a computer program of the present embodiment is stored. The RAM 203 is a storage device that provides an execution area for the computer program of the present embodiment. By loading the computer program described in a programming language, such as assembler, C, C++, Java (registered trademark), JavaScript (registered trademark), PERL, RUBY, and PYTHON on the RAM 203 and by executing the computer program under the control of an operating system (OS), such as WINDOWS (registered trademark) series, Mac (registered trademark) OS, UNIX (registered trademark), and LINUX (registered trademark), the communication device 10a realizes each functional unit, which will be described later, on the communication device 10a.

The SSD 204 includes a non-volatile memory (not illustrated) such as a flash memory that stores therein various types of data of an image and audio and electrically erasable and programmable ROM (EEPROM), and controls reading or writing of the various types of data from or to the flash memory. The media drive 206 is a device into which a recording medium 205, such as a flash memory, can be inserted and controls reading or writing of data from or to the recording medium 205.

The communication device 10a further includes an operation button 207, a power switch 208, a network interface (I/F) 210, an image capturing element I/F 212, an audio input-output I/F 215, a display device I/F 216, a display device I/F 217, and an external device I/F 218. These devices are connected via the data bus 209.

The operation button 207 is an input device that selects a communication device of a remote point with which a session is to be established and performs various settings. The power switch 208 switches ON and OFF the power of the communication device 10a The network I/F 210 is an interface that provides a connection to the router 50 and performs data communications via the network 60.

The image capturing element I/F 212 is an interface to which a charge coupled device (CCD) 211 that captures a subject to generate an image is connected and controls the CCD 211 to generate an image. While a CCD is employed as an image capturing element in the present embodiment, another image capturing element, such as a complementary metal oxide semiconductor (CMOS), may be employed.

The audio input-output I/F 215 is an interface to which a microphone 213 and a speaker 214 are connected and receives and outputs an audio signal from the microphone 213 and to the speaker 214. The display device I/F 216 is an interface to which the display device 20a is connected and outputs an image to the display device 20a. The display device I/F 217 is an interface to which the display device 22a is connected and outputs an image to the display device 22a.

The display devices 20a and 22a display various images output from the communication device 10a. The external device I/F 218 is an interface to which the image supply device 30a is connected and receives an image from the image supply device 30a.

Figure 3:
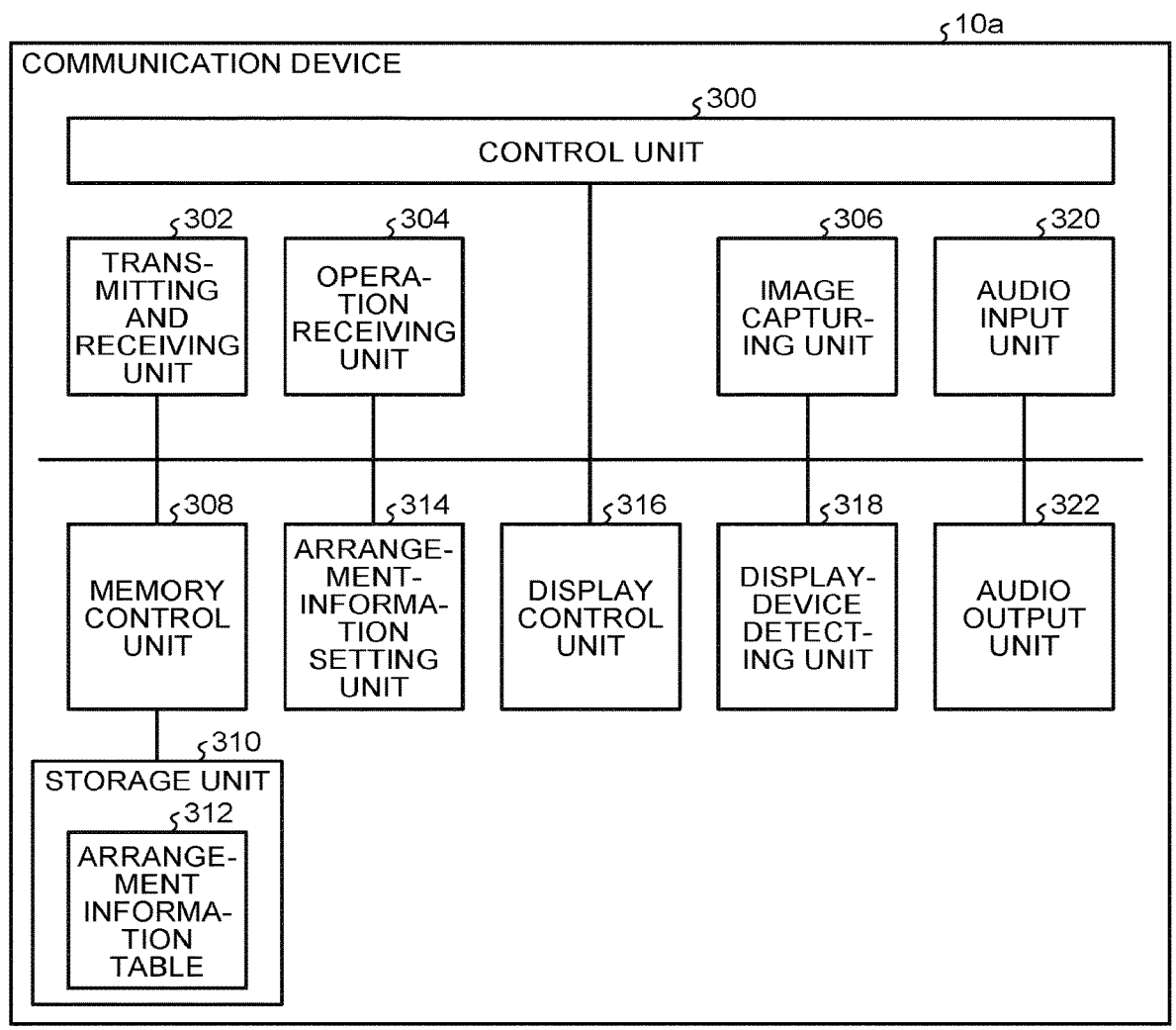
FIG. 3 is a block diagram of a functional configuration of the communication device 10a according to the embodiment.

FIG. 3 is a block diagram of a functional configuration of the communication device 10a according to the embodiment. The functional configuration of the communication device 10a will be described below with reference to FIG. 3. Because the functional configurations of the other communication devices 10b to 10h are the same as that of the communication device 10a, explanations thereof will be omitted.

The communication device 10a includes a control unit 300, a transmitting and receiving unit 302, an operation receiving unit 304, and an image capturing unit 306.

The control unit 300 is a functional unit that collectively controls processing performed by the communication device 10a. The control unit 300 performs various processing using functional units, which will be described later.

The transmitting and receiving unit 302 is a functional unit that performs communications with the communication management device 40 or the image supply device 30a and is realized by the network I/F 210 and the external device I/F 218.

The operation receiving unit 304 is a functional unit that receives various types of operating instructions issued by a user. If the user turns ON the power switch 208 for example, a power-on instruction is issued. When receiving the instruction, the operation receiving unit 304 turns ON the power of the communication device 10a. Furthermore, if the user changes a display scheme of the display devices 20a to 20h and 22a to 22h with the operation button 207, a display scheme change instruction is issued. When receiving the instruction, the operation receiving unit 304 causes an arrangement-information setting unit 314 to store the display scheme (e.g., "VIEW_MULTI" and "SHARED_MULTI") specified by the user in a storage unit 310 as setting information for specifying the display scheme of the display device (hereinafter, referred to as "display-scheme setting information"). The display scheme according to the present embodiment will be described later in greater detail with reference to FIG. 5.

The image capturing unit 306 is a functional unit that captures a subject to generate an image and is realized by the CCD 211 and the image capturing element I/F 212. If the communication device 10a starts, the image capturing unit 306 generates a captured image.

The communication device 10a further includes a memory control unit 308, the storage unit 310, the arrangement-information setting unit 314, a display control unit 316, a display-device detecting unit 318, an audio input unit 320, and an audio output unit 322.

The memory control unit 308 is a unit that controls the storage unit 310. The memory control unit 308 stores various types of data in the storage unit 310 and reads various types of data stored in the storage unit 310.

The arrangement-information setting unit 314 is a functional unit that sets arrangement information and display-scheme setting information for specifying a display scheme for an image to be displayed on the display devices 20a to 20h and 22a to 22h. The arrangement-information setting unit 314 sets the arrangement information in an arrangement information table 312 in the storage unit 310. Furthermore, the arrangement-information setting unit 314 stores the display-scheme setting information in the storage unit 310.

The display control unit 316 is a functional unit that controls the display devices 20a to 20h and 22a to 22h. By using the display-scheme setting information stored in the storage unit 310 and the arrangement information registered in the arrangement information table 312, the display control unit 316 specifies images to be displayed on the display device. In accordance with predetermined screen division, the display control unit 316 displays the images on the display devices 20a and 22a.

The images to be displayed on the display devices 20a and 22a include an image captured by the image capturing unit 306 of the communication devices 10a to 10h of the local point or the remote point (hereinafter, referred to as a "captured image") and an image supplied from the image supply devices 30a to 30h of the local point or the remote point.

The audio input unit 320 is a functional unit that detects audio, such as speech of the user, to generate an audio signal. Furthermore, the audio input unit 320 converts audio of the user into an audio signal and measures the intensity of the audio signal. If the intensity is equal to or higher than a predetermined threshold, the audio input unit 320 detects speech of the user. The audio output unit 322 is a functional unit that converts an audio signal into audio and outputs the audio.

The display-device detecting unit 318 detects a display device in an electrified state connected to the communication device 10a. The display-device detecting unit 318 detects an electrified state of display devices connected to the display device I/F 216 and 217 with a graphics driver serving as a device driver of the display devices and counts the number of display devices in an electrified state. In the present embodiment, by using an application programming interface (API) function provided by WINDOWS (registered trademark) OS and the graphics driver, the display-device detecting unit 318 counts the number of display devices in an electrified state.

If the power of the communication device 10a is turned ON, the control unit 300 performs detection processing for a display device, which will be described later, and causes the image capturing unit 306 to generate a captured image. If the image supply devices 30a to 30h are connected to the communication devices 10a to 10h respectively, the control unit 300 causes the image supply devices 30a to 30h to display a menu screen, thereby enabling image supply.

In accordance with an instruction issued by the user, the control unit 300 requests the communication management device 40 to establish a session with a communication device of a remote point. If the session is established, the control unit 300 transmits the captured image of the local point generated by the image capturing unit 306 and the image supplied from the image supply device 30a to the communication device of the remote point via the communication management device 40. Furthermore, if an image is received from the communication device of the remote point, the control unit 300 displays the image on the display devices 20a and 22a. Moreover, if the image supply devices 30a to 30h are connected to the communication devices 10a to 10h respectively, and the user selects a sharing start button on the menu screen displayed on the image supply devices, the control unit 300 acquires an image from the image supply devices 30a to 30h.

If speech of the user is detected, the control unit 300 adds information indicating that the user is making speech (hereinafter, referred to as "speech information") to the captured image and transmits the captured image to the communication management device 40. If a captured image to which speech information is added is received from the remote point, the control unit 300 changes the arrangement information in the arrangement information table 312 such that the captured image is displayed in a predetermined display area on the display devices 20a and 22a.

Figure 4:
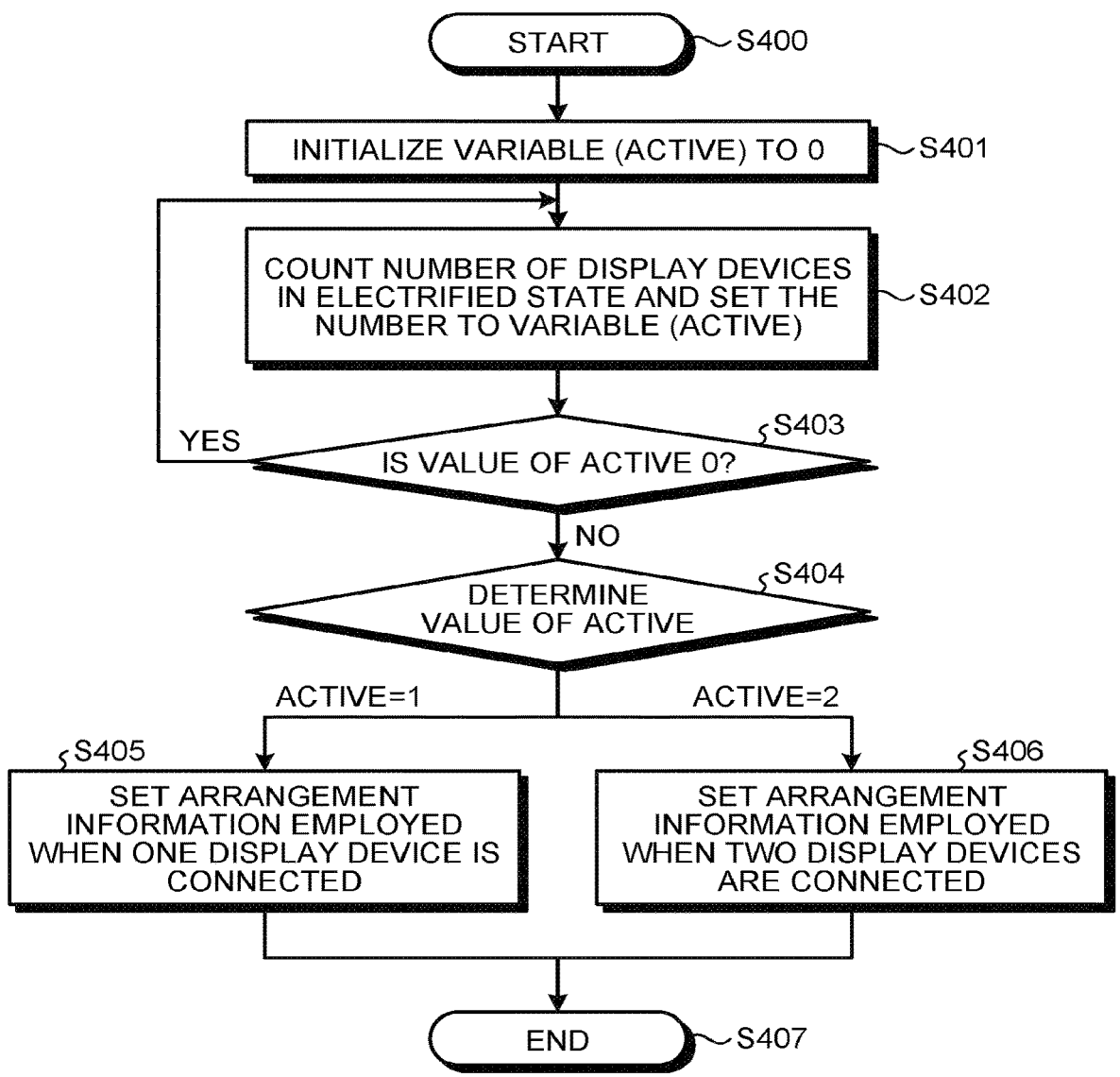
FIG. 4 is a flowchart of detection processing for a display device performed by a communication device according to the embodiment at start-up.

FIG. 4 is a flowchart of detection processing for a display device performed by the communication device according to the present embodiment at start-up. The detection processing for a display device performed when the power of the communication device 10a is turned ON will now be described with reference to FIG. 4.

The processing illustrated in FIG. 4 starts with turning ON the power of the communication device 10a at Step S400. At Step S401, the display-device detecting unit 318 initializes a variable (ACTIVE) stored in the RAM 203 to 0. At Step S402, the display-device detecting unit 318 counts the number of display devices in an electrified state among the display devices connected to the communication device 10a and sets the number to the variable (ACTIVE). At Step S403, the arrangement-information setting unit 314 determines whether the value of the variable (ACTIVE) is 0. If the value of the variable (ACTIVE) is 0 (Yes), the system control is returned to Step S402. By contrast, if the value of the variable (ACTIVE) is not 0 (No), the system control goes to Step S404.

At Step S404, the arrangement-information setting unit 314 determines the value of the variable (ACTIVE). If the value of the variable (ACTIVE) is 1, that is, if one display device in an electrified state is connected, the system control goes to Step S405. At Step S405, the arrangement-information setting unit 314 sets arrangement information in FIG. 5 employed when one display device is connected in the arrangement information table. The processing is then terminated at Step S407.

By contrast, if the value of the variable (ACTIVE) is 2, that is, if two display devices in an electrified state are connected, the system control goes to Step S406. At Step S406, the arrangement-information setting unit 314 sets arrangement information in FIG. 6 and FIG. 8 employed when two display devices are connected in the arrangement information table. The processing is then terminated at Step S407.

Figure 5:
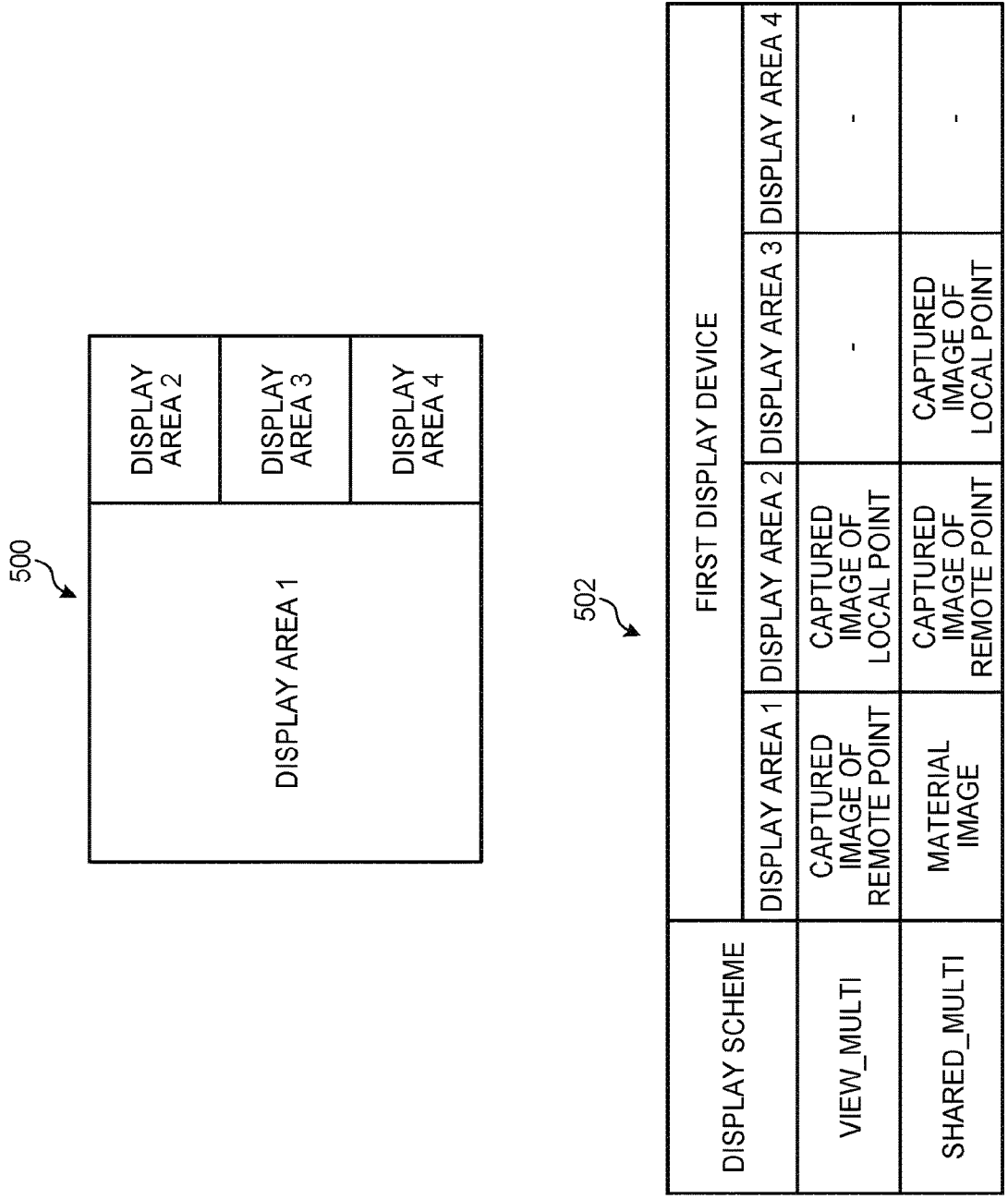
FIG. 5 is a view of a display scheme and an arrangement information table employed when one display device in an electrified state is connected to the communication device 10a according to the embodiment.

FIG. 5 is a view of the display scheme and the arrangement information table employed when one display device in an electrified state is connected to the communication device 10a according to the embodiment. An explanation will be made of screen division 500 and an arrangement information table 502 of a display device employed when one display device in an electrified state is connected to the communication device 10a with reference to FIG. 5.

The screen division 500 is screen division of the display device connected to the communication device 10a. In the embodiment illustrated in FIG. 5, the display area of the display device is divided in four, and the area of a display area 1 is larger than those of the other display areas 2 to 4.

In the arrangement information table 502, registered are a display scheme of images to be displayed on the display device and identification information of the images to be displayed on the display areas of the display device in a manner associated with each other as the arrangement information employed, when one display device in an electrified state is connected to the communication device 10a.

Examples of the display scheme according to the present embodiment include "VIEW_MULTI" and "SHARED_MULTI". "VIEW_MULTI" is a scheme for displaying captured images of the local point and the remote point in the communication devices 10a to 10h. "SHARED_MULTI" is a scheme for displaying an image supplied from the image supply devices 30a to 30h in addition to the captured images of the local point and the remote point. In the present embodiment, the display scheme is specified by the user and stored in the storage unit 310 as the display-scheme setting information.

In the embodiment illustrated in FIG. 5, if the display scheme is "VIEW_MULTI", the captured image of the remote point is displayed on the display area 1, and the captured image of the local point is displayed on the display area 2. By contrast, if the display scheme is "SHARED_MULTI", a material image is displayed on the display area 1, the captured image of the remote point is displayed on the display area 2, and the captured image of the local point is displayed on the display area 3.

In another embodiment, the display scheme may not be switched between "VIEW_MULTI" and "SHARED_MULTI" by a user command as in the present embodiment. Alternatively, the communication devices 10a to 10h may switch the display schemes by detecting the fact that image supply performed by the image supply devices 30a to 30h is started.

Specifically, the communication devices 10a to 10h detect an explicit notification from the image supply devices 30a to 30h, respectively, indicating start of communications and start of image supply in a specific application port for example, and automatically switch the display scheme from "VIEW_MULTI" to "SHARED_MULTI". If the image supply performed by the image supply devices 30a to 30h is finished or interrupted, the communication devices 10a to 10h switch the display scheme from "SHARED_MULTI" to "VIEW_MULTI". Thus, it is possible to save the operation performed by the user and to perform stream processing of a supplied image more efficiently.

More specifically, if the transmitting and receiving unit 302 of the communication devices 10a to 10h receives an image from the image supply devices 30a to 30h, respectively, the control unit 300 issues an image supply start event notifying that image supply performed by the image supply devices is started. If the image supply start event is detected, the arrangement-information setting unit 314 sets "SHARED_MULTI" as the display-scheme setting information. The display control unit 316 then refers to the arrangement information table and displays the material image and the captured images on the display devices 20a and 20b in accordance with the arrangement information associated with the display-scheme setting information "SHARED_MULTI".

If the image supply performed by the image supply devices 30a to 30h is stopped, the control unit 300 issues an image supply stop event notifying that the image supply performed by the image supply devices is stopped. If the image supply stop event is detected, the arrangement-information setting unit 314 switches the display-scheme setting information from "SHARED_MULTI" to "VIEW_MULTI". The display control unit 316 then refers to the arrangement information table and displays the captured image on the display devices 20a and 20b in accordance with the arrangement information associated with the display-scheme setting information "VIEW_MULTI".

While the screen of the display device is divided into four display areas in the present embodiment, the screen may be divided into three display areas or five or more display areas in another embodiment. Furthermore, while the arrangement information according to the present embodiment is arrangement information employed when an image is shared by two points, the present embodiment can be applied to the case where an image is shared by three or more points.

If an image is shared by three or more points and the display scheme "VIEW_MULTI" is specified, the arrangement information is changed such that the captured image of the remote point to be focused by the user, that is, the captured image of the point at which speech is detected is displayed on the display area 1. Thus, it is possible to display the captured image of the point at which the user is making speech on the display area 1.

Figure 6:
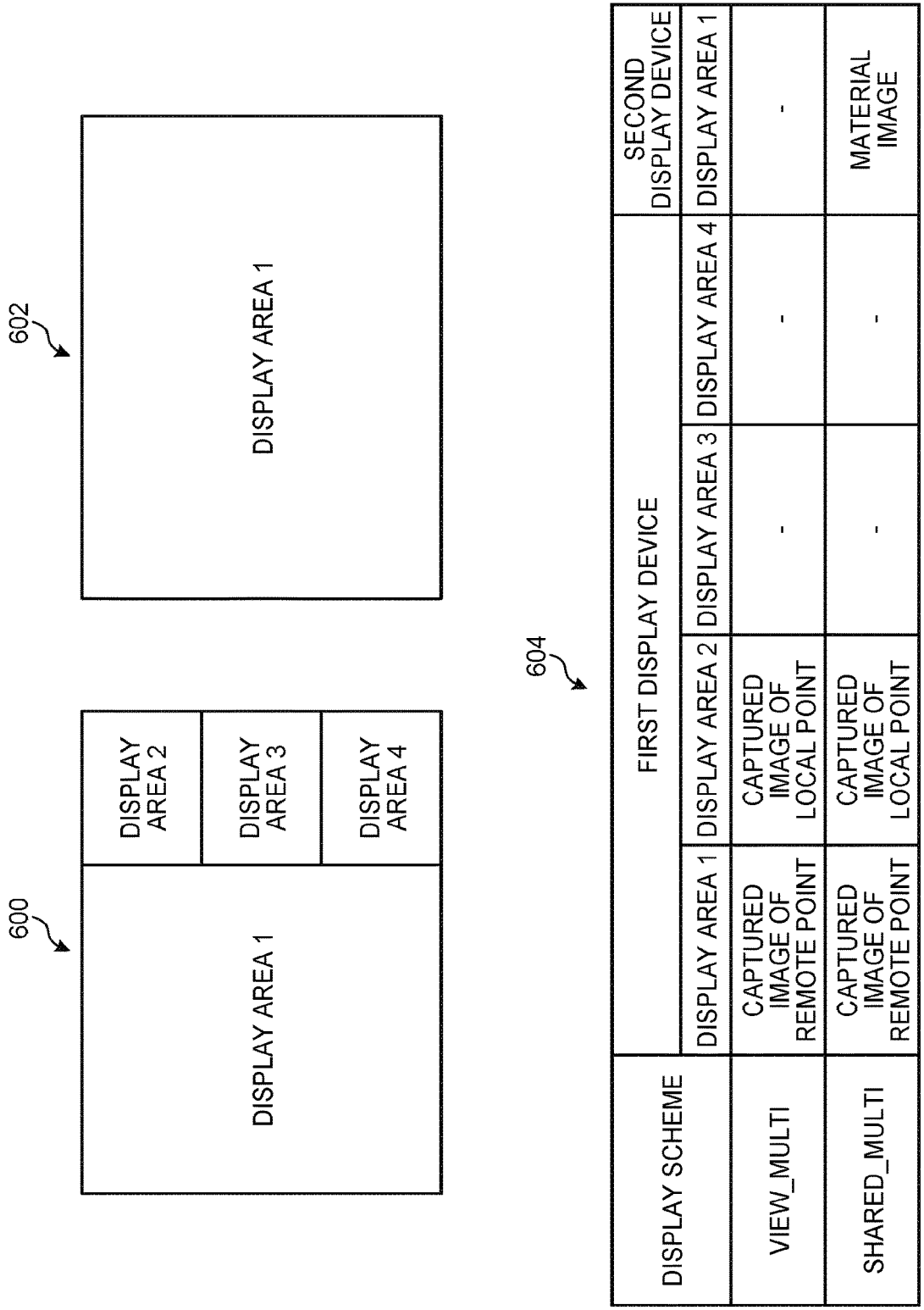
FIG. 6 is a view of the display scheme and the arrangement information table employed when two display devices in an electrified state are connected to the communication device 10a according to the embodiment.

FIG. 6 is a view of the display scheme and the arrangement information table employed when two display devices in an electrified state are connected to the communication device 10*a* according to the embodiment. An explanation will be made of screen divisions 600 and 602 and an arrangement information table 604 of display devices when two display devices in an electrified state are connected to the communication device 10*a* with reference to FIG. 6.

The screen division 600 is screen division of a first display device connected to the communication device 10*a*. In the embodiment illustrated in FIG. 6, the display area of the display device is divided in four, and the area of a display area 1 is larger than those of the other display areas 2 to 4. The screen division 602 is screen division of a second display device connected to the communication device 10*a* and is composed of one display area.

In the arrangement information table 604, a display scheme of images to be displayed on the first display device and the second display device and identification information of the images to be displayed on the display areas of the display devices are registered in a manner associated with each other as the arrangement information employed when two display devices in an electrified state are connected to the communication device 10*a*.

In the embodiment illustrated in FIG. 6, if the display scheme is "VIEW_MULTI", the captured image of the remote point is displayed on the display area 1 of the first display device, and the captured image of the local point is displayed on the display area 2 of the first display device. By contrast, no image is displayed on the display area 1 of the second display device.

If the display scheme is "SHARED_MULTI", the captured image of the remote point is displayed on the display area 1 of the first display device, and the captured image of the local point is displayed on the display area 2 of the first display device. Furthermore, a material image is displayed on the display area 1 of the second display device.

While the screen of the display device is divided into four display areas in the present embodiment, the screen may be divided into three display areas or five or more display areas in another embodiment. Furthermore, while the arrangement information according to the present embodiment is arrangement information employed when an image is shared by two points, the present embodiment can be applied to the case where an image is shared by three or more points. If an image is shared by three or more points, the arrangement information is changed such that the captured image of the remote point to be focused by the user, that is, the captured image of the point at which speech is detected is displayed on the display area 1 of the first display device. Thus, it is possible to display the captured image of the point at which the user is making speech on the display area.

In the present embodiment, the captured images of the local point and the remote point are displayed on the first display device; and an image, such as a material image, supplied from the image supply devices 30*a* to 30*h* is displayed on the second display device. Therefore, it is possible to increase the visibility of these images.

Figure 7:
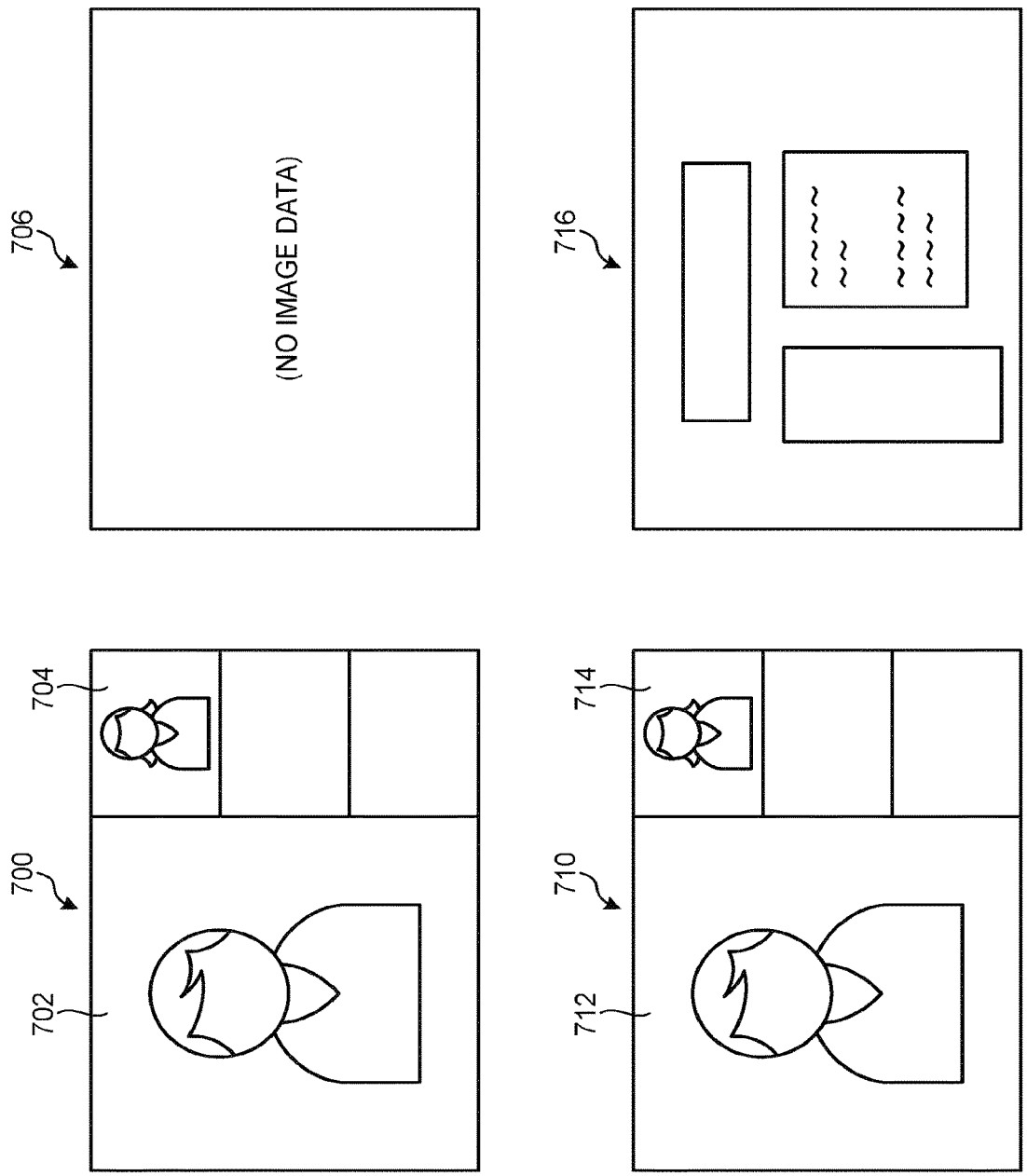
FIG. 7 is a view of screens of the display devices based on screen division and arrangement information illustrated in FIG. 6 according to the embodiment.

FIG. 7 is a view of screens of the display devices based on the screen division and the arrangement information illustrated in FIG. 6 according to the embodiment. A screen 700 and a screen 706 are the screen of the first display device and the screen of the second display device, respectively, when the display scheme "VIEW_MULTI" is selected. The captured image of the remote point is displayed on a display area 702 of the screen 700, and the captured image of the local point is displayed on a display area 704. No image is displayed on the screen 706.

A screen 710 and a screen 716 are the screen of the first display device and the screen of the second display device, respectively, when the display scheme "SHARED_MULTI" is selected. The captured image of the remote point is displayed on a display area 712 of the screen 710, and the captured image of the local point is displayed on a display area 714. Furthermore, a material image is displayed on the screen 716.

Figure 8:
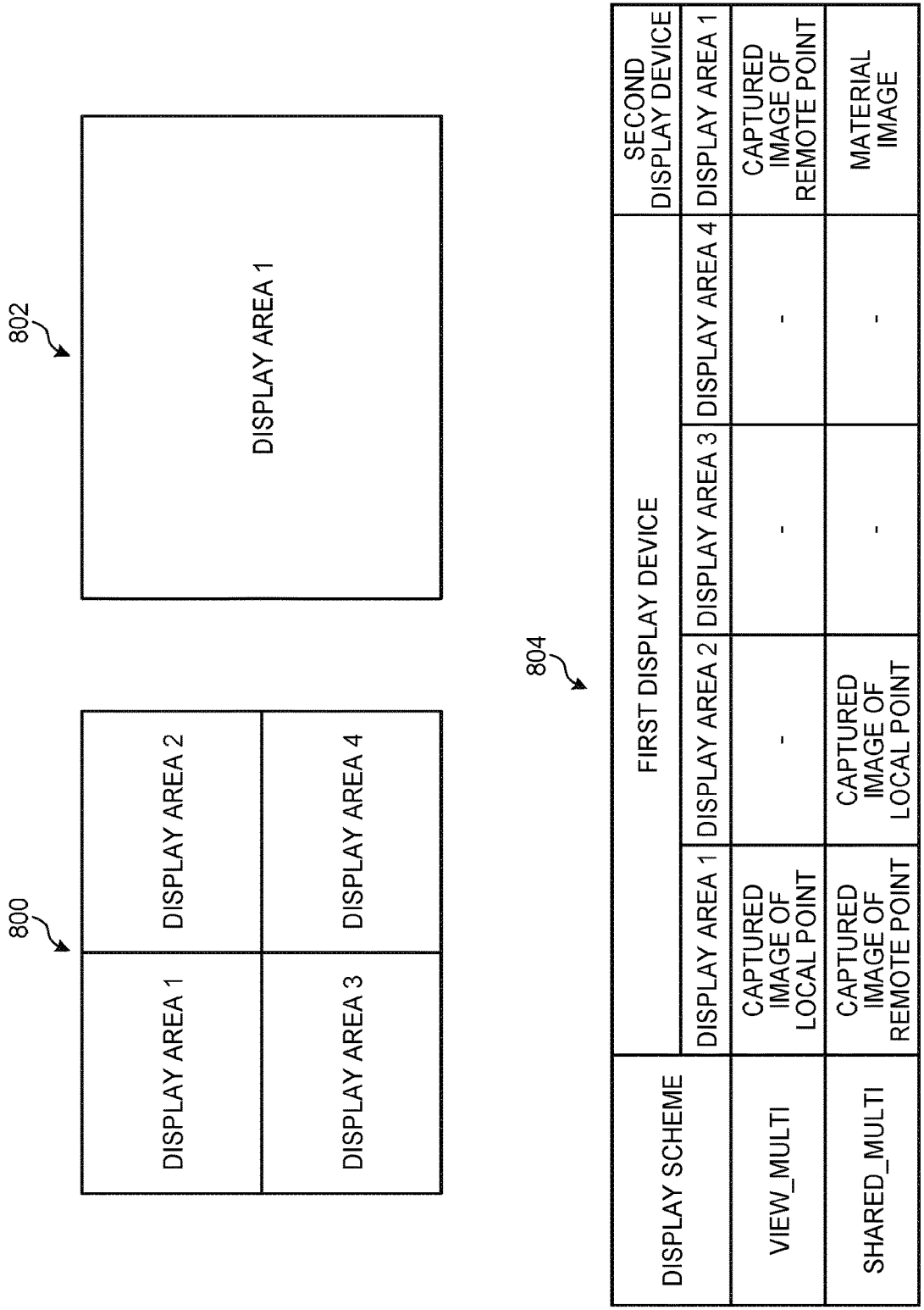
FIG. 8 is a view of the display scheme and the arrangement information table employed when two display devices in an electrified state are connected to the communication device 10a according to another embodiment.

FIG. 8 is a view of the display scheme and the arrangement information table employed when two display devices in an electrified state are connected to the communication device 10*a* according to an another embodiment. An explanation will be made of screen divisions 800 and 802 and an arrangement information table 804 of display devices employed when two display devices in an electrified state are connected to the communication device 10*a* with reference to FIG. 8.

The screen division 800 is screen division of the first display device connected to the communication device 10*a*. In the embodiment illustrated in FIG. 8, the display area of the display device is divided in four. The screen division 802 is screen division of the second display device connected to the communication device 10*a* and is composed of one display area. While the screen of the display device is divided into four display areas in the present embodiment, the screen may be divided into three display areas or five or more display areas in another embodiment.

In the arrangement information table 804, a display scheme of images to be displayed on the first display device and the second display device and identification information of the images to be displayed on the display areas of the display devices are registered in a manner associated with each other as the arrangement information employed when two display devices in an electrified state are connected to the communication device 10*a*.

In the embodiment illustrated in FIG. 8, if the display scheme is "VIEW_MULTI", the captured image of the local point is displayed on the display area 1 of the first display device, and the captured image of the remote point is displayed on the display area 1 of the second display device.

If the display scheme is "SHARED_MULTI", the captured image of the remote point is displayed on the display area 1 of the first display device; and the captured image of the local point is displayed on the display area 2 of the first display device. Furthermore, a material image is displayed on the display area 1 of the second display device.

While the arrangement information according to the present embodiment is arrangement information employed when an image is shared by two points, the present embodiment can be applied to the case where an image is shared by three or more points. In this case, if the display scheme "VIEW_MULTI" is specified, the arrangement information is changed such that the captured image of the remote point to be focused by the user, that is, the captured image of the point at which speech is detected is displayed on the second display device. Thus, it is possible to display the captured image of the point at which the user is making speech on the second display device and to display the captured images of the other points on the first display device.

In the present embodiment, the captured images are displayed on the first display device, and an image, such as a material image, supplied from the image supply device is displayed on the second display device. Therefore, it is possible to increase the visibility of these images. Furthermore, because the captured image of the remote position to be focused is displayed on the display device formed of one display area, it is possible to increase the visibility of the image.

Figure 9:
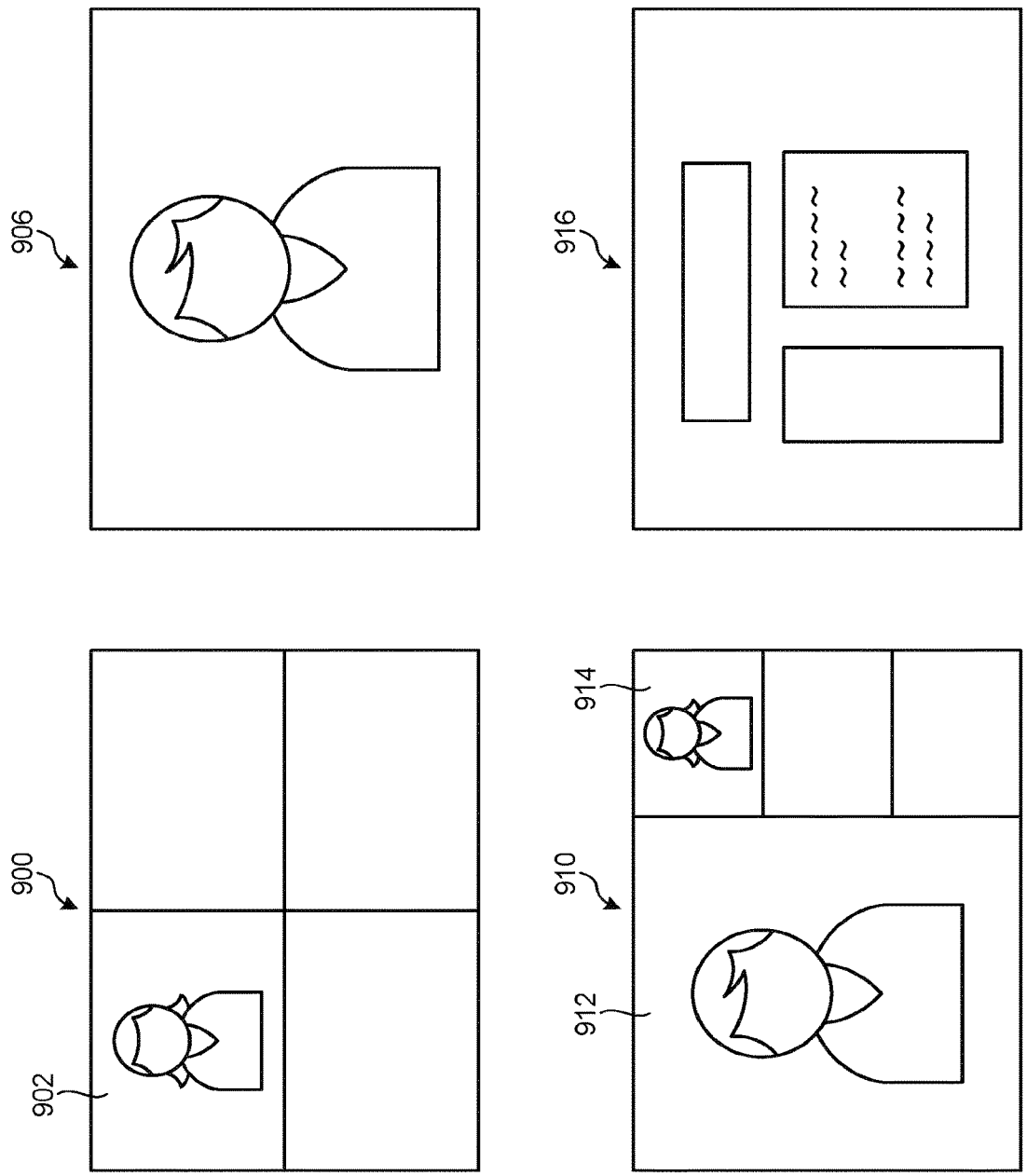
FIG. 9 is a view of screens of the display devices based on screen division and arrangement information illustrated in FIG. 8 according to the embodiment.

FIG. 9 is a view of screens of the display devices based on the screen division and the arrangement information illustrated in FIG. 8 according to the embodiment. A screen 900 and a screen 906 are the screen of the first display device and the screen of the second display device, respectively, employed when the display scheme "VIEW_MULTI" is selected. The captured image of the local point is displayed on a display area 902 of the screen 900; and the captured image of the remote point is displayed on the screen 906.

A screen 910 and a screen 916 are the screen of the first display device and the screen of the second display device, respectively, employed when the display scheme "SHARED_MULTI" is selected. The captured image of the remote point is displayed on a display area 912 of the screen 910; and the captured image of the local point is displayed on a display area 914. Furthermore, a material image is displayed on the screen 916.

FIG. 10 is a flowchart of detection processing for a display device performed by the communication device according to the embodiment after start-up. The detection processing for a display device performed after start-up of the communication device 10a will now be described with reference to FIG. 10.

The processing illustrated in FIG. 10 is started at Step S1000. At Step S1001, the display-device detecting unit 318 determines whether an electrification change event issued from the OS of the communication device 10a by detecting an electrified state of the display devices 20a to 20h and 22a to 22h is received. If no electrification change event is received (No), the processing at Step S1001 is repeated. By contrast, if an electrification change event is received (Yes), the system control goes to Step S1002.

At Step S1002, the display-device detecting unit 318 initializes a variable (ACTIVE) stored in the RAM 203 to 0. At Step S1003, the display-device detecting unit 318 counts the number of display devices in an electrified state among the display devices connected to the communication device 10a and sets the number to the variable (ACTIVE). At Step S1004, the arrangement-information setting unit 314 determines whether the value of the variable (ACTIVE) is 0. If the value of the variable (ACTIVE) is 0 (Yes), the system control is returned to Step S1003. By contrast, if the value of the variable (ACTIVE) is not 0 (No), the system control goes to Step S1005.

At Step S1005, the arrangement-information setting unit 314 determines the value of the variable (ACTIVE). If the value of the variable (ACTIVE) is 1, that is, if one display device in an electrified state is connected, the system control goes to Step S1006. At Step S1006, the arrangement-information setting unit 314 sets arrangement information in FIG. 5 employed when one display device is connected in the arrangement information table. The processing is then terminated at Step S1008.

By contrast, if the value of the variable (ACTIVE) is 2, that is, if two display devices in an electrified state are connected, the system control goes to Step S1007. At Step S1007, the arrangement-information setting unit 314 sets arrangement information in FIG. 6 or FIG. 8 employed when two display devices are connected in the arrangement information table. The processing is then terminated at Step S1008.

With the processing described above, the communication device 10a can detect display devices that come into an electrified state by being connected to the communication device 10a or turning ON the power of the display devices after the communication device 10a starts. As a result, it is possible to display an image on these display devices.

While the present embodiment has been described, the embodiment described above is not intended to limit the present invention. Various changes, such as modifications or omissions of the components in the present embodiment or additions of other components to the components in the present embodiment, may be made in a manner conceivable by those skilled in the art. Any aspects would fall within the scope and spirit of the inventions as long as they realize the advantageous effects of the present invention.

The computer program realizing the functional units described above according to the embodiments may be provided in a manner recorded in a computer-readable recording medium, such as a hard disk drive (HDD) a compact disk read-only memory (CD-ROM), a magneto-optical disk (MO), a flexible disk (FD), an EEPROM, and an erasable programmable ROM (EPROM) and may be distributed over a network as a file in an installable format.

With the configuration described above, the communication device according to the embodiment can increase the visibility of an image displayed on a display device.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device, comprising:
   a first interface configured to connect to a first display via wired communication;
   a second interface configured to connect to a second display via wired communication;
   a third interface configured to connect to an image capturing device;
   a transmitting and receiving circuit configured to transmit data of a first captured image captured by the image capturing device to another device, receive data of a second captured image transmitted from the other device, and receive data of a material image supplied from the other device; and
   processing circuitry configured to
      repeatedly monitor whether a change in an electrified state of the first and second displays has occurred, and when determining that the change has occurred,
         determine which of the first display and the second display are physically connected to the communication device via wired communication and in an electrified state;
         when determining that only one of the first display and the second display is physically connected to the communication device via wired communication and in the electrified state, display the first captured image, the second captured image, and the material image on the first display or the second display connected to the communication device; and
         when determining that both the first display and the second display are physically connected to the communication device via wired communication and in the electrified state, display the first captured image and the second captured image on the first display, and display the material image on the second display.

2. The communication device according to claim 1, wherein the processing circuitry is further configured to determine which of the first display and the second display are physically connected to the communication device via wired communication based on corresponding electrified states of the first display and the second display.

3. The communication device of claim 1, wherein the processing circuitry is further configured to
   determine whether supply of the material image from the other device has started;
   when determining that only one of the first display and the second display is physically connected to the communication device via wired communication and in the electrified state, and the supply of the material images has started, display the first captured image, the second captured image, and the material image on the first display or the second display connected to the communication device; and
   when determining that both the first display and the second display are physically connected to the communication device via wired communication and in the electrified state and the supply of the material images has not started, display the first captured image on the first display, and display the second captured image on the second display.

4. The communication device of claim 3, wherein the processing circuitry is further configured to determine whether the supply of the material image from the other device has started based on a notification received from the other device via a specific port of the communication device.

5. A communication method executed by a communication device including a first interface configured to connect to a first display via wired communication, a second interface configured to connect to a second display via wired communication, and a third interface configured to connect to an image capturing device, the method comprising:
   transmitting data of a first captured image captured by the image capturing device to another device, receive data of a second captured image transmitted from the other device, and receive data of a material image supplied from the other device; and
   repeatedly monitoring whether a change in an electrified state of the first and second displays has occurred, and when determining that the change has occurred,
      determining which of the first display and the second display are physically connected to the communication device via wired communication and in an electrified state;
      when determining that only one of the first display and the second display is physically connected to the communication device via wired communication and in the electrified state, displaying the first captured image, the second captured image, and the material image on the first display or the second display connected to the communication device; and
      when determining that both the first display and the second display are physically connected to the communication device via wired communication and in the electrified state, displaying the first captured image and the second captured image on the first display, and displaying the material image on the second display.

6. The communication method according to claim 5, further comprising determining which of the first display and the second display are physically connected to the communication device via wired communication based on corresponding electrified states of the first display and the second display.

7. A non-transitory computer-readable medium storing a program, wherein the program, when executed by a computer that controls a communication device that includes a first interface configured to connect to a first display via wired communication, a second interface configured to connect to a second display via wired communication, and a third interface configured to connect to an image capturing device, causes the computer to execute a method comprising:
   transmitting data of a first captured image captured by the image capturing device to another device, receive data of a second captured image transmitted from the other device, and receive data of a material image supplied from the other device; and
   repeatedly monitoring whether a change in an electrified state of the first and second displays has occurred, and when determining that the change has occurred,
      determining which of the first display and the second display are physically connected to the communication device via wired communication and in an electrified state;
      when determining that only one of the first display and the second display is physically connected to the communication device via wired communication and in the electrified state, displaying the first captured image, the second captured image, and the material image on the first display or the second display connected to the communication device; and when determining that both the first display and the second display are physically connected to the communication device via wired communication and in the electrified state, displaying the first captured image and the second captured image on the first display, and displaying the material image on the second display.

8. The computer-readable medium according to claim 7, wherein the method further comprises determining which of the first display and the second display are physically connected to the communication device via wired communication based on corresponding electrified states of the first display and the second display.

* * * * *